C. H. LENSKE.
RESILIENT WHEEL.
APPLICATION FILED JULY 27, 1917.

1,252,456.

Patented Jan. 8, 1918.
2 SHEETS—SHEET 1.

Witnesses:
C. E. Wessels.
A. A. Olson

Inventor:
Charles H. Lenske,
By Joshua R. H. Potts
his Attorney.

C. H. LENSKE.
RESILIENT WHEEL.
APPLICATION FILED JULY 27, 1917.
1,252,456.
Patented Jan. 8, 1918.
2 SHEETS—SHEET 2.
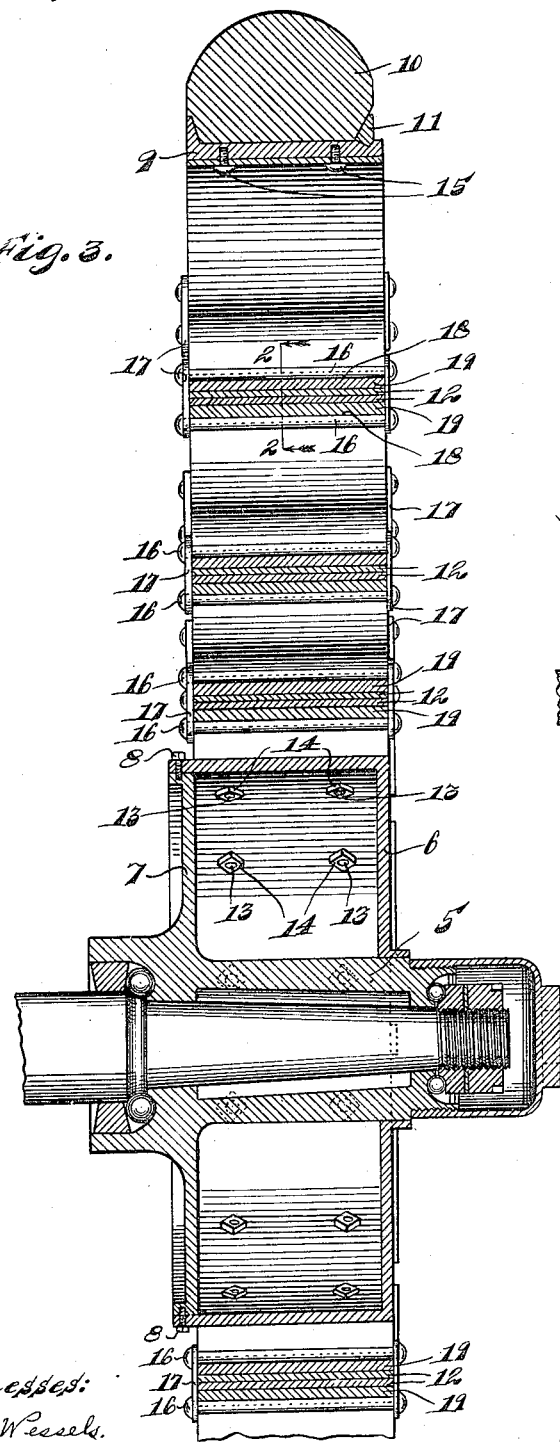
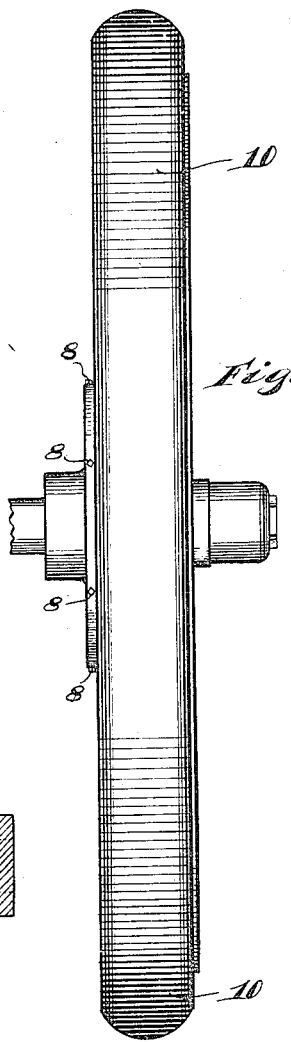
Witnesses:
C. E. Wessels.
A. A. Olsen.
Inventor:
Charles H. Lenske,
By Joshua R. H. Potts
his Attorney.

UNITED STATES PATENT OFFICE.

CHARLES H. LENSKE, OF CHICAGO, ILLINOIS.

RESILIENT WHEEL.

1,252,456.  Specification of Letters Patent.  Patented Jan. 8, 1918.

Application filed July 27, 1917. Serial No. 183,028.

*To all whom it may concern:*

Be it known that I, CHARLES H. LENSKE, a citizen of the United States, and a resident of the city of Chicago, county of Cook, and State of Illinois, have invented certain new and useful Improvements in Resilient Wheels, of which the following is a specification.

My invention relates to improvements in resilient wheels and has for its object the production of a device of this character, which will be of durable and economical construction and through the medium of which resiliency in a vehicle wheel will be obtained without the employment of pneumatic tires, such as are now employed to secure this end.

A further object is the production of a device of this character which will be of simple construction and highly efficient in use.

Other objects will appear hereinafter.

The invention consists in the combinations and arrangements of parts hereinafter described and claimed.

Figure 1:
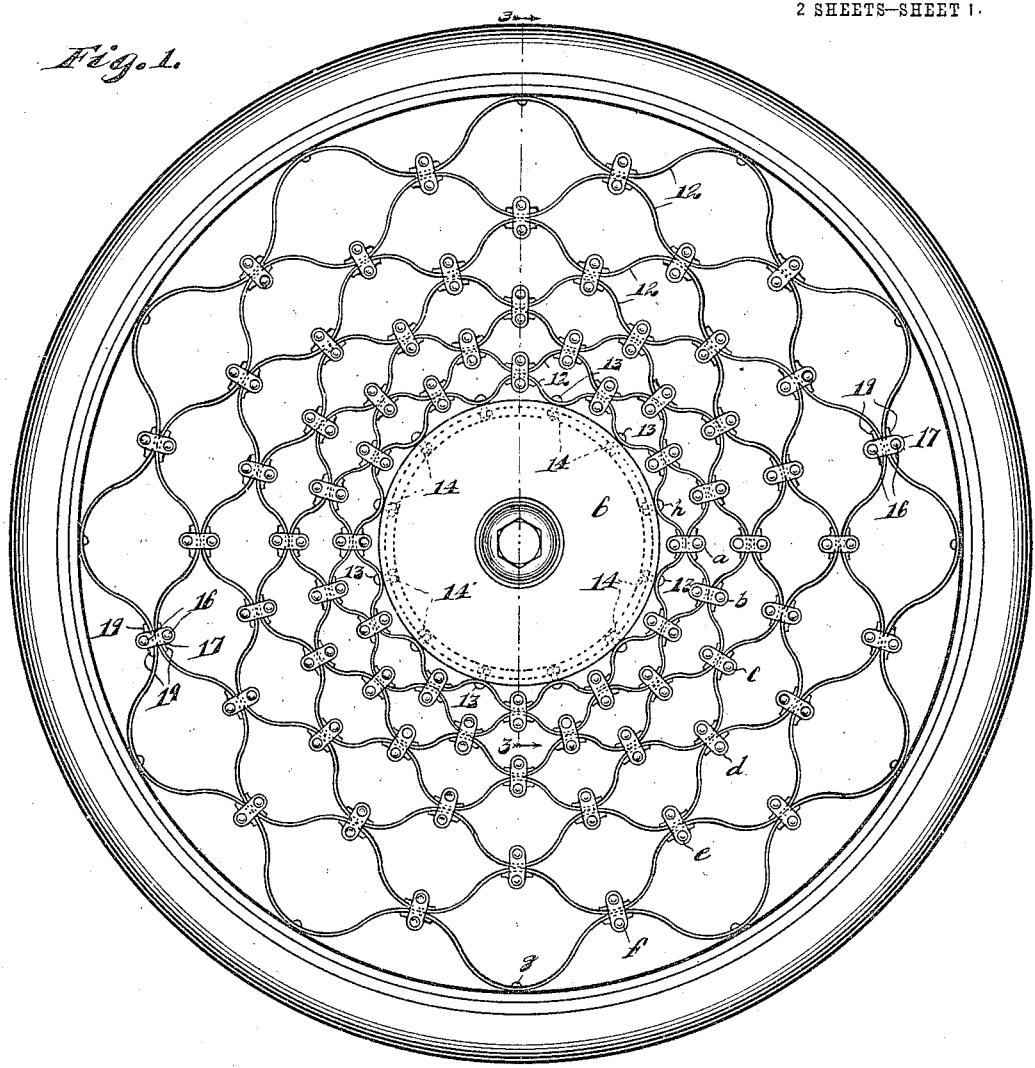
Figure 2:
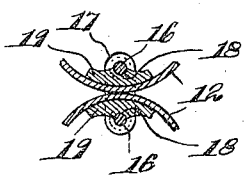

The invention will be best understood by reference to the accompanying drawings forming a part of this specification, and in which, Figure 1 is a side elevation of a resilient wheel embodying the invention, Fig. 2, an enlarged detail section taken on line 2—2 of Fig. 3, Fig. 3, an enlarged section taken on line 3—3 of Fig. 1, and Fig. 4, a front elevation of the wheel.

The preferred form of construction as illustrated in the drawings comprises a wheel consisting of a hub 5 adapted for suitable mounting upon a wheel spindle. The outer portion of said hub is formed by an annular member 6, angular in cross section, which is rigidly secured to an outwardly extending flange 7 on the body of the hub, by means of screws 8. The rim 9 of the wheel is simply an annular integral band in which a tire 10 of solid rubber or the like is mounted and held by an annular key or keeper 11, as will be readily understood.

Interposed between the hub and the rim is a plurality of concentric annular tortuous resilient members 12 of graduated diameters, each of said members 12 being formed of band iron or steel which is tortuously formed as seen and tempered to secure the desired resiliency. The inwardly curved tortuosities of the inner member 12 are rigidly secured to the hub member 6 by means of bolts 13 and coöperating nuts 14, the assembly of said member upon said hub part being of course effected before the latter is secured to the hub proper. The outwardly curved tortuosities of the outermost member 12 are rigidly secured by screws 15 to the rim 9, as clearly seen in Fig. 3.

The outwardly curved tortuosities of each of said members register with and are connected to the inwardly curved tortuosities of the next outer member 12, as clearly seen in Figs. 1, 2 and 3. Each of these connections comprises a pair of transversely extending bars or bolts 16 which extend across the remote sides of the members to be connected, the ends of said bars or bolts being rigidly connected by yokes or links 17 provided at the edges of the members 12. The members 16 engage loosely in channels 18 formed in the outer sides of seat forming members 19 which are secured rigidly as by welding or otherwise, to the members 12, as seen in Fig. 2.

With this arrangement it will be seen that the members 12 will be firmly connected together but at the same time relative movement or flexing of said members will be permitted to a considerable degree, thus lending the desired resiliency to the wheel, as will be readily understood. Also the connection is such as to positively lock adjacent of said spring members together so that in case the wheel is used for driving, that is when power is applied thereto, the pull upon the hub of the wheel will not have the effect of permanently shifting the relative positions of said members. In this connection also the arrangement is such that the connections between the members 12 are arranged in substantially tangentially extending lines emanating from the hub of the wheel. For instance, it will be seen, that the points of connection $a$, $b$, $c$, $d$, $e$, $f$ and $g$ extend substantially tangentially from the point $h$ of the hub. With this arrangement, in case of power being applied to the hub for draft, the force will be transmitted from the hub to the rim of the wheel in substantially tangentially extending lines which will of course reduce to a minimum the likelihood of distortion of the spring members 12 through overpressure applied thereto.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A resilient wheel comprising a hub; a rim; a plurality of concentric tortuous annular resilient members of graduated diameters interposed between said hub and said rim, the innermost and outermost of said members being connected respectively with said hub and rim, the outwardly curved tortuosities of each of said members being connected with the inwardly curved tortuosities of the next outer member, each connection between said members comprising two spaced connecting elements extending across the remote sides of said members; channels at said sides of said members engaged by said elements; and a rigid connection between the corresponding ends of said connecting elements, substantially as described.

2. A resilient wheel comprising a hub; a rim; a plurality of concentric tortuous annular resilient members of graduated diameters interposed between said hub and said rim, the innermost and outermost of said members being connected respectively with said hub and rim, the outwardly curved tortuosities of each of said members being connected with the inwardly curved tortuosities of the next outer member, each connection between said members comprising two spaced connecting elements extending across the remote sides of said members; seat-forming members fixed rigidly to the remote sides of said members having channels at their outer sides engaged by said connecting elements; and a rigid connection between the corresponding ends of said connecting elements, substantially as described.

3. A resilient wheel comprising a hub; a rim; a plurality of concentric tortuous annular resilient members of graduated diameters interposed between said hub and said rim, the innermost and outermost of said members being connected respectively with said hub and rim, the outwardly curved tortuosities of each of said members being connected with the inwardly curved tortuosities of the next outer member, each connection between said members comprising two spaced connecting elements extending across the remote sides of said members; seat-forming members fixed rigidly to the remote sides of said members having channels at their outer sides engaged by said connecting elements; and yokes arranged at the edges of said annular resilient members and extending between and connecting the corresponding ends of said connecting elements, substantially as described.

In testimony whereof I have signed my name to this specification in the presence of two subscribing witnesses.

CHARLES H. LENSKE.

Witnesses:
JOSHUA R. H. POTTS,
JANET E. FARRELL.

Copies of this patent may be obtained for five cents each, by addressing the "Commissioner of Patents, Washington, D. C."